United States Patent
Poggenburg et al.

(10) Patent No.: US 6,445,994 B2
(45) Date of Patent: Sep. 3, 2002

(54) METHOD AND DEVICE FOR DETECTING CORNERING OF A VEHICLE

(75) Inventors: Ruediger Poggenburg, Vaihingen/enz; Uwe Pruhs, Boenningheim; Stefan Diehle, Korntal-Muenchingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/747,256

(22) Filed: Dec. 22, 2000

(30) Foreign Application Priority Data

Dec. 23, 1999 (DE) .......................... 199 62 328

(51) Int. Cl.$^7$ .............................. B60T 8/72; G06F 17/00
(52) U.S. Cl. .............................. 701/72; 701/70; 701/74; 303/146
(58) Field of Search ............................. 701/72, 74, 75, 701/80, 41, 70, 90, 91; 180/197, 282; 303/146, 140, 148

(56) References Cited

U.S. PATENT DOCUMENTS 5,802,491 A * 9/1998 Bush et al. ................. 701/76
5,876,101 A * 3/1999 Taniguchi et al. .......... 303/146
6,138,066 A * 10/2000 Guo et al. .................. 701/38
6,158,274 A * 12/2000 Guo et al. ................. 73/118.1

FOREIGN PATENT DOCUMENTS

EP 0 377 645 11/1991
EP 0 376 984 5/1992

OTHER PUBLICATIONS

X–A. van Zanten et al., "FDR–die Fahrdynamikregelung von Bosch" (ESP—the Electronic Stability Program of Bosch), Automobile Technology Magazine, 96 (1994), pp. 674–689.

* cited by examiner

Primary Examiner—Tan Nguyen
(74) Attorney, Agent, or Firm—Kenyon & Kenyon

(57) ABSTRACT

A method and device for detecting cornering of a vehicle, or for ascertaining the transverse acceleration ($a_y$) of a vehicle, where a signal indicating cornering of the vehicle, a measure of the curve radius, or the transverse acceleration ($a_y$) of the vehicle is detected, using a reference speed ($v_S$, $v_{SL}$, $v_{SR}$) for at least each side of the vehicle; and where a reference speed ($v_S$, $v_{SL}$, $v_{SR}$) of one side of the vehicle is determined as a function of the deceleration of at least one wheel on this side of the vehicle.

35 Claims, 4 Drawing Sheets

METHOD AND DEVICE FOR DETECTING CORNERING OF A VEHICLE

Figure 1:
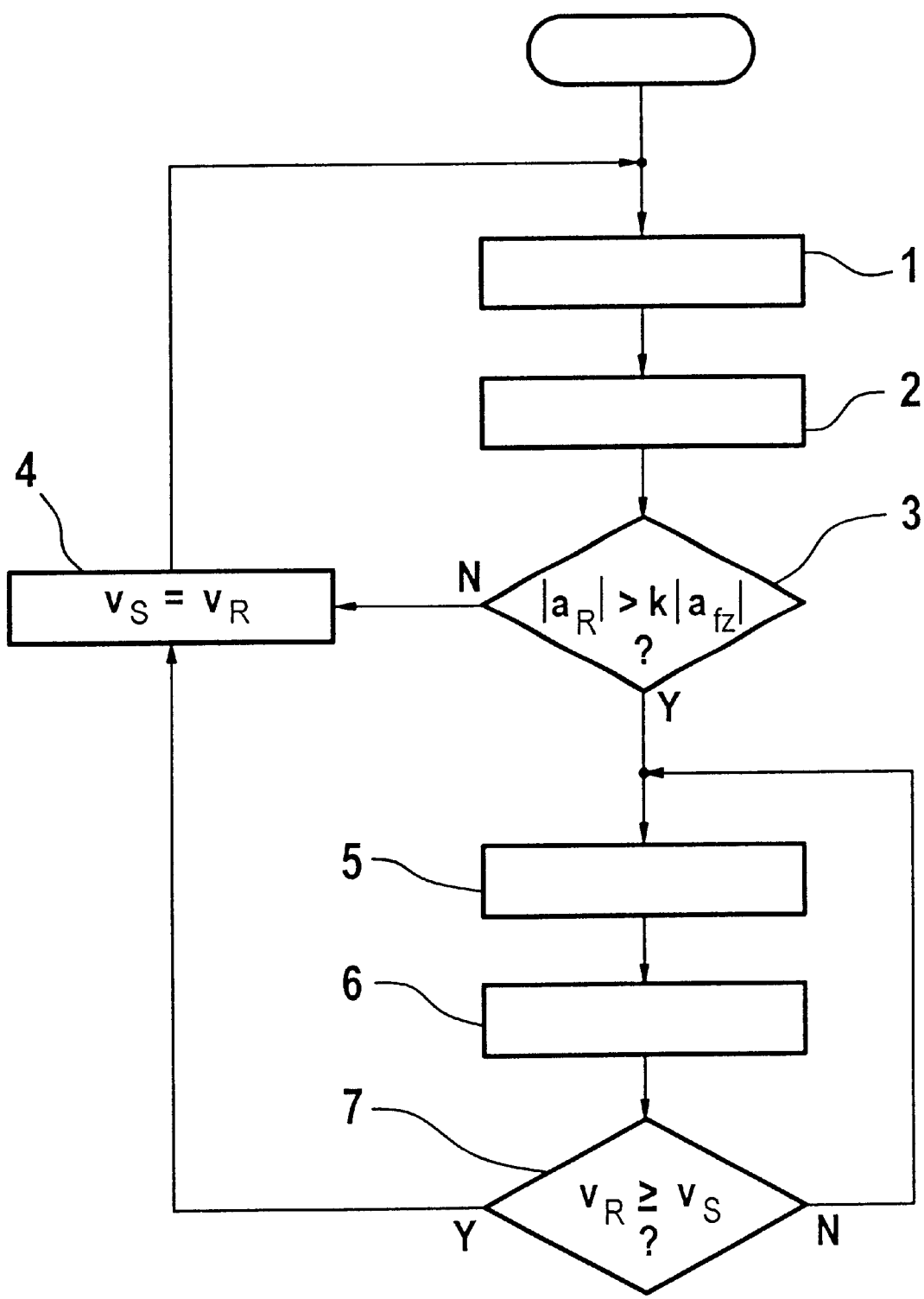

The present invention relates to a method and a device for detecting cornering of a vehicle. Such a method, i.e. such a device detects a signal that indicates cornering. Such a signal that indicates cornering can be the curve radius, the transverse acceleration, or a signal containing comparable information. Methods for detecting cornering are described, for example, in EP 0 377 645 B1 and EP 0 376 984 B1. Under certain conditions, it has been shown that these methods do not indicate cornering with enough precision. This is especially true in vehicles equipped with an anti-lock braking system (ABS), a traction control system (TCS), or an electronic stability program (ESP). Further details regarding ABS, TCS, and ESP can be taken, e.g. from the article "FDR—die Fahrdynamikregelung von Bosch" (ESP—the Electronic Stability Program of Bosch), by A. van Zanten, R. Erhardt, and G. Pfaff, ATZ Automobiltechnische Zeitschrift (Automobile Technology Magazine), 96 (1994) 11, pages 674 to 689.

For example, the known methods for detecting cornering can often not determine cornering precisely enough at wheels or axles, at which measures influencing operating dynamics are implemented, such as braking actions, ABS control actions, TCS control actions, or control actions from an electronic stability program. This is also apparent in the case of braking on a so-called split-friction road surface, i.e. roadways having a different coefficient of friction on the left and right sides of the vehicle. The known method cannot reliably differentiate such braking from braking while cornering.

Correspondingly, the object of the present invention is to provide an improved method and device for detecting cornering of a vehicle.

The object of the present invention is achieved by a method according to claim 1, and by a device according to claim 11. To detect cornering of a vehicle or to ascertain the transverse acceleration of a vehicle, a signal indicating vehicle cornering, a measure of the curve radius, or the transverse acceleration of the vehicle is determined in this case, using a reference speed for at least one side of the vehicle; a reference speed of a side of the vehicle being determined as a function of the deceleration of at least one wheel on this side of the vehicle. In this context, an example of a signal indicating cornering of the vehicle can be the curve radius, the transverse acceleration of the vehicle, or the difference of the reference speeds of the two sides of the vehicle. In this manner, cornering is clearly detected more precisely, and in particular, more reliably.

In an advantageous refinement of the present invention, the speed of the wheel is ascertained, e.g. measured, and the deceleration of the wheel is determined by differentiating the wheel speed with respect to time.

In an advantageous further refinement of the present invention, the reference speed of the wheel is set equal to the speed of the wheel, when the deceleration of the wheel is less than or (essentially) equal to the deceleration of the vehicle, after the vehicle deceleration is increased by means of a weighting value.

In another advantageous refinement of the present invention, the reference speed of the wheel is interpolated, when the deceleration of the wheel is greater than the deceleration of the vehicle, after the vehicle deceleration is increased by means of a weighting value.

In an additional advantageous refinement of the present invention, the reference speed is interpolated according to the equation $$v_{s,neu} = v_{s,alt} - \alpha a_{fz} \Delta t$$

where $v_{s,neu}$ is the interpolated value of the reference speed, $v_{s,alt}$ is the previous value of the reference speed, $\alpha$ is a constant, which is advantageously the weighting value, $a_{fz}$ is the deceleration of the vehicle, and $\Delta t$ is the cycle time for the interpolation.

In a further advantageous refinement of the present invention, the deceleration of the vehicle is multiplied by the weighting value.

In another advantageous refinement of the present invention, the weighting value is formed as a function of the driving situation.

In another advantageous refinement of the present invention, the weighting value assumes a value between 1.3 and 1.5 in response to sharp deceleration of the vehicle, and a value between 1.0 and 1.2 in response to low deceleration of the vehicle.

In an advantageous further refinement of the present invention, the reference speed of the wheel is set equal to the speed of the wheel, when the speed of the wheel is greater than or essentially equal to the wheel reference speed obtained by interpolation.

In another advantageous refinement of the present invention, the speed of at least two vehicle wheels is ascertained, e.g. measured, and the reference speed of each side of the vehicle is ascertained, the reference speed of a wheel being determined as a function of the deceleration of the fastest wheel of the side.

Figure 2:
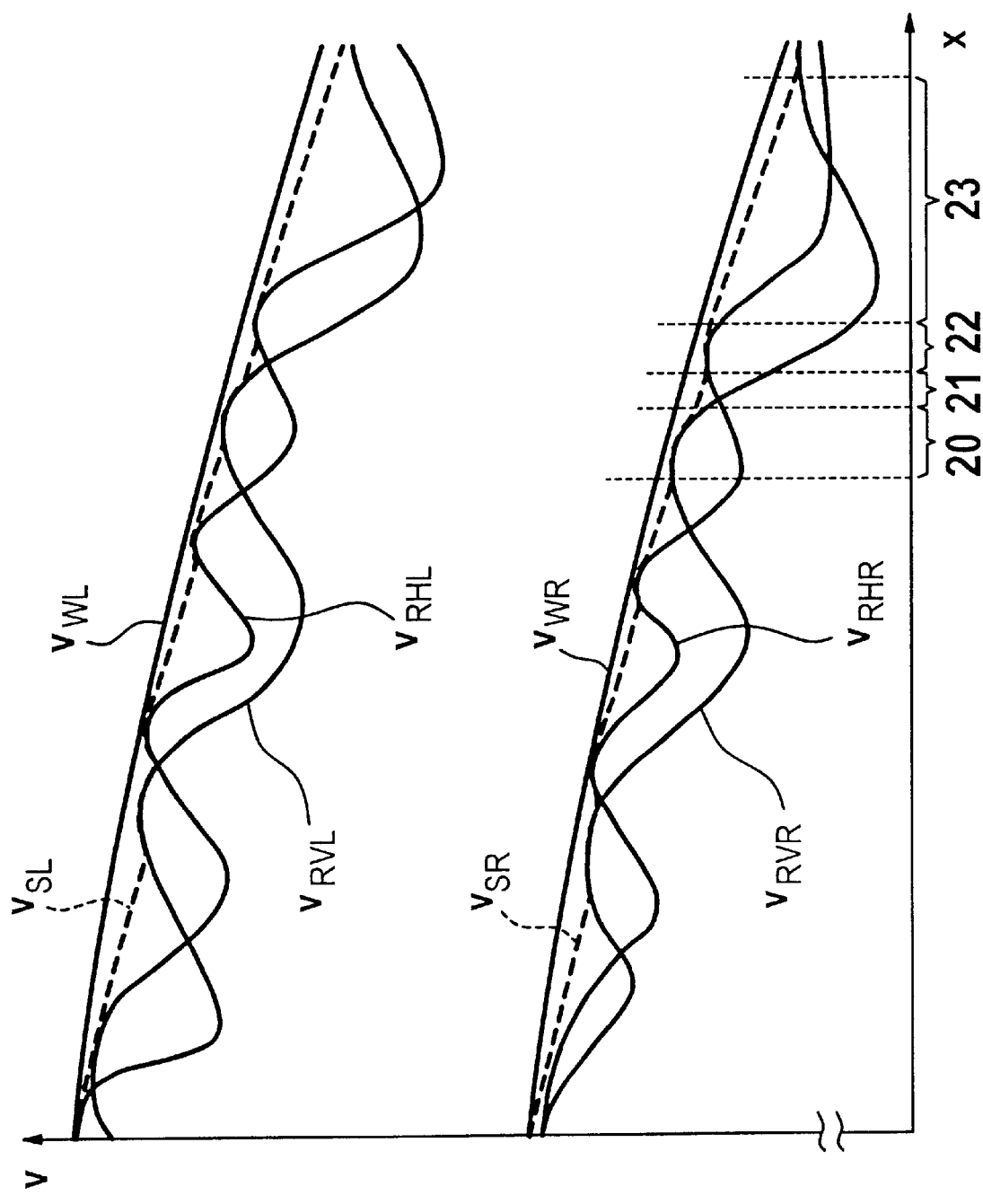
Figure 3:
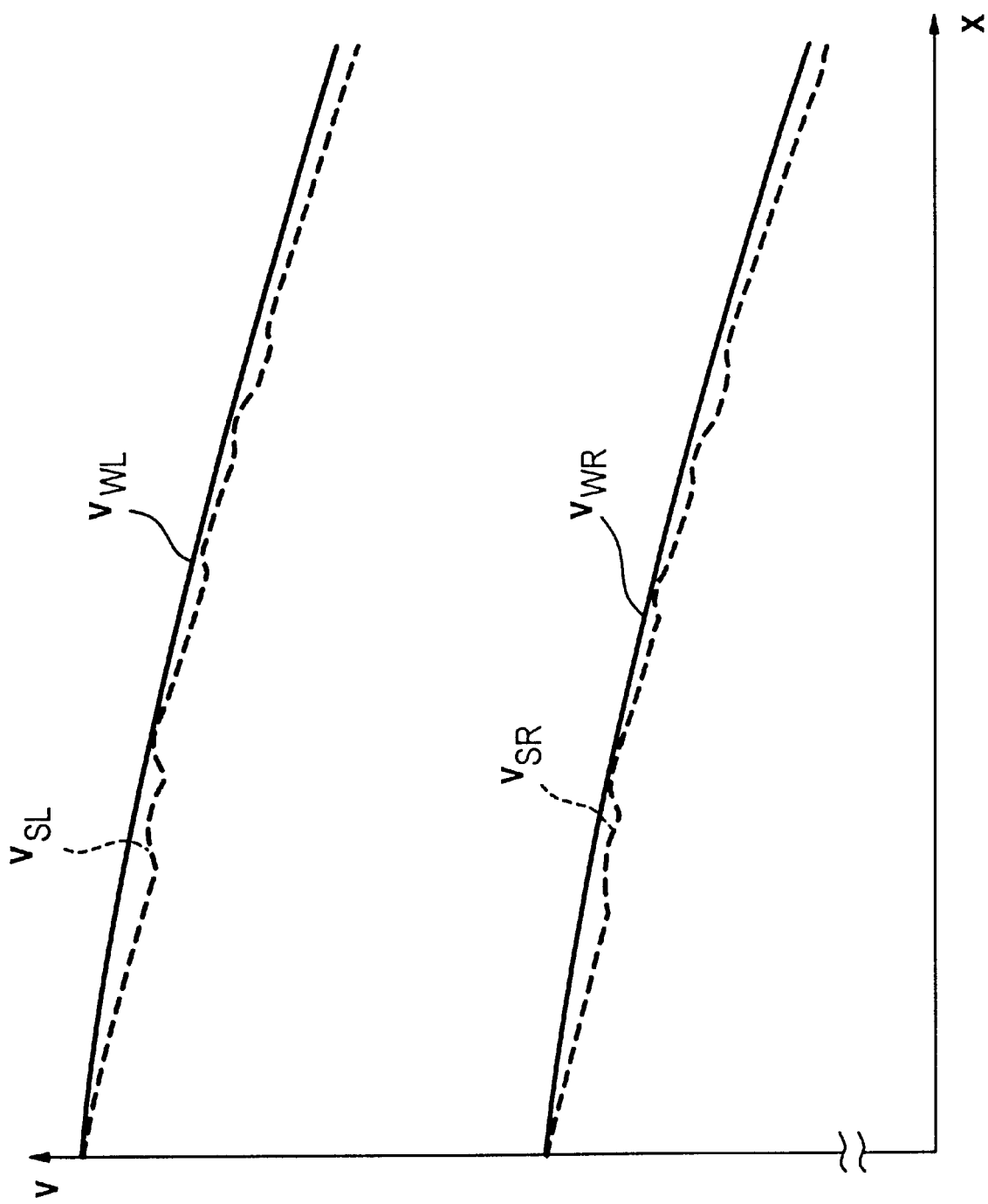

Further advantages and details result from the subsequent description of the exemplary embodiments. The individual figures show:

FIG. 1 an exemplary embodiment for calculating the reference speed;

FIG. 2 a speed-distance diagram;

FIG. 3 a speed-distance diagram; and

Figure 4:
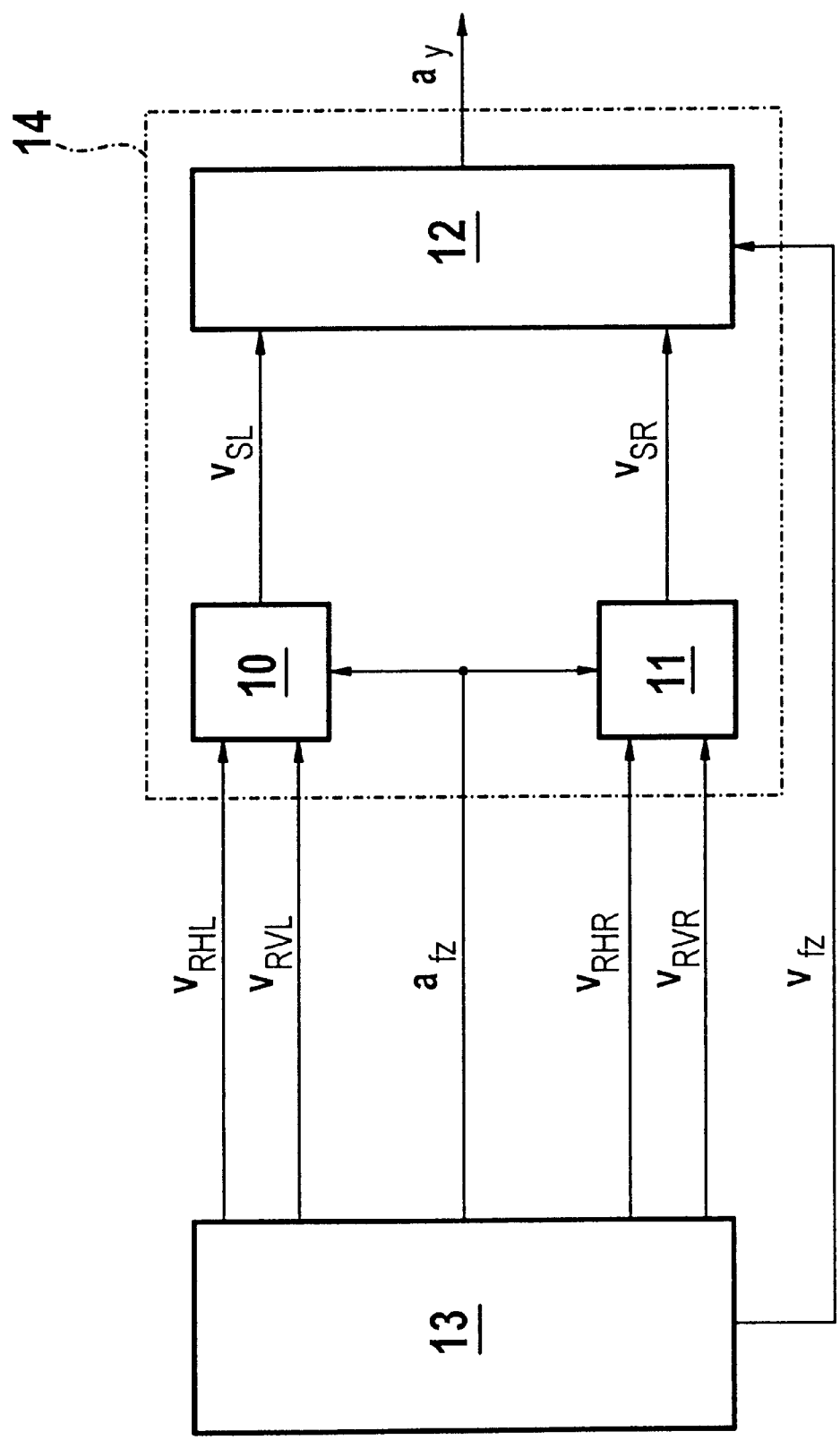

FIG. 4 means for detecting a signal indicating cornering.

FIG. 1 shows an exemplary embodiment for calculating reference speed $v_S$ for a side of a vehicle. In a first step 1, the current speed of the wheel or wheels on one side of a vehicle is read in. If the speed of only one wheel is read in, then this speed is designated by $V_R$. However, an advantageous further refinement provides for reading in the speeds of all or both wheels on a side of a vehicle. In this case, it is also determined in step 1, which of these wheels on one side has the highest speed. The highest speed is then value $v_R$. Therefore, this highest speed is likewise designated as the wheel speed in the subsequent explanation of FIG. 1.

Deceleration $a_R$ of the wheel is determined in a next step 2. To that end, $v_R$ is differentiated. In this case, it is advantageous that the differentiation is not performed by a pure derivative-action element, but rather by a $DT_1$ element or a $DT_2$ element.

In step 1, vehicle deceleration $a_{fz}$ is also read in. The value for the vehicle deceleration can be obtained, e.g. using a low-pass-filtered and differentiated value of the vehicle speed, or using a low-pass-filtered and differentiated tachometer signal. Deceleration $a_y$ of the vehicle means of an electronic stability program is advantageously calculated as shown, for example, in the article "FDR—die Fahrdynamikregelung von Bosch" (ESP—the Electronic Stability Program of Bosch), by A. van Zanten, R. Erhardt, and G. Pfaff, ATZ Automobiltechnische Zeitschrift (Automobile Technology Magazine), 96 (1994) 11, pages 674 to 689.

If, e.g. an electronic stability program ESP is implemented in the vehicle, as is described in this article, then the values of wheel speeds $v_R$ and the value of vehicle deceleration $a_{fz}$ are provided by the electronic stability program, in an advantageous further refinement.

Using decision block 3, it is tested if $$|\alpha_R| > k |\alpha_{fz}|$$

where k is a weighting value. In an advantageous refinement, weighting value k is formed as a function of the driving situation. In an advantageous refinement, it assumes a value between 1.3 and 1.5 in response to sharp deceleration $a_{fz}$ of the vehicle, and a value between 1.0 and 1.2 in response to low deceleration $a_{fz}$ of the vehicle. If weighting value k is formed as a function of the driving situation, then weighting value k is advantageously formed in step 2.

If the condition $$|\alpha_R| > k |\alpha_{fz}|$$

is not satisfied, or essentially not satisfied in an alternative embodiment, then reference speed $v_s$ is set equal to speed $v_R$ of the wheel, in a step 4.

On the other hand, if the condition $$|\alpha_R| > k |\alpha_{fz}|$$

is satisfied, or essentially satisfied in an alternative embodiment, then differential speed $v_s$ is ascertained by interpolation. In this case, reference speed $v_s$ is interpolated in an advantageous refinement, according to the equation $$v_{s,neu} = v_{s,alt} - \alpha a_{fz} \Delta t$$

where $v_{s,neu}$ is the interpolated value of the reference speed, $v_{s,alt}$ is the previous (and possibly, already interpolated) value of the reference speed, $\alpha$ is a constant, which is advantageously the weighting value K, and $\Delta t$ is the cycle time for the interpolation.

After interpolating, the value of reference speed $v_s$ is equal to $V_{s,neu}$. A step 6, which includes steps 1 and 2, follows step 5. That is, the same measures are implemented in step 6 as in step 1 and step 2.

Following step 6 is a decision block 7, in which it is tested if $$v_R \geq v_S$$

If this condition is not satisfied, or essentially not satisfied in an alternative embodiment, then steps 5 and 6 are repeated. On the other hand, step 4 comes next if the condition is satisfied, or essentially satisfied in an alternative embodiment.

FIG. 2 indicates a speed-distance diagram, in which various speeds v are represented as a function of distance x. The speed-distance diagram in FIG. 2 shows the speed of a vehicle through a right-hand curve, where $V_{RVL}$ designates the (circumferential) speed of the left front wheel, $V_{RHL}$ designates the (circumferential) speed of the left rear wheel, $V_{RVR}$ designates the (circumferential) speed of the right front wheel, $V_{RHR}$ designates the (circumferential) speed of the right rear wheel, $V_{SL}$ designates the reference speed on the left side of the vehicle, $V_{SR}$ designates the reference speed on the right side of the vehicle, $V_{WL}$ designates the true speed on the left side of the vehicle, and $V_{WR}$ designates the true speed on the right side of the vehicle.

FIG. 2 clarifies the procedure according to FIG. 1. In segment 20, for example, reference speed $v_{SR}$ on the right side of the vehicle is thus based on speed $v_{RVR}$ of the right front wheel, i.e. $v_{SR} = v_{RVR}$. However, reference speed $v_{SR}$ on the right side of the vehicle is ascertained by interpolation, in segment 21. In segment 22, speed $v_{RHR}$ of the right rear wheel increases so sharply, that it is greater than the reference speed $v_{SR}$ on the right side of the vehicle, which was obtained by interpolation. Accordingly, the equation $v_{SR} = v_{RHR}$ is valid. In segment 23, speed $v_{RHR}$ has fallen so sharply again, that reference speed $v_{SR}$ of the right side of the vehicle is ascertained by interpolation.

Reference speed $v_{SL}$ on the left side of the vehicle, reference speed $v_{SR}$ on the right side of the vehicle, true speed $v_{WL}$ on the left side of the vehicle, and true speed $v_{WR}$ on the right side of the vehicle are represented again in the speed-distance diagram in FIG. 3. FIG. 3 clearly shows that the reference speeds $v_{SL}$ and $v_{SR}$ only differ slightly from the true speeds $v_{WL}$ and $v_{WR}$, even when the individual wheels of the vehicle are decelerating sharply. In particular, the difference of $v_{SL}$ and $v_{SR}$, which is ultimately a measure of the curve, is nearly identical to the difference of $v_{WL}$ and $v_{WR}$. This clearly shows that the method according to the present invention, especially the discussed, advantageous refinement thereof, allows cornering to be detected in a particularly precise manner, even when the individual vehicle wheels are decelerating sharply.

FIG. 4 displays means 14 for detecting a signal that indicates cornering. In the exemplary embodiment displayed here in FIG. 4, the one signal indicating vehicle cornering is transverse acceleration ay of the vehicle. Means 14 for detecting the one signal indicating vehicle cornering include two reference-speed calculators 10 and 11, as well as a curve calculator 12. Reference-speed calculator 10 ascertains reference speed $v_{SL}$ on the left side of the vehicle, as a function of vehicle deceleration $a_{fz}$, speed $v_{RVL}$ of the left front wheel, and speed $v_{RHL}$ of the left rear wheel. Reference-speed calculator 11 ascertains reference speed $v_{SR}$ on the right side of the vehicle, as a function of vehicle deceleration $a_{fz}$, speed $v_{RVR}$ of the right front wheel, and speed $v_{RHR}$ of the right rear wheel. In addition, the exemplary embodiment for calculating the reference speed according to FIG. 1 is implemented in each reference-speed calculator 10, 11. Curve calculator 12 calculates transverse acceleration $a_y$ of the vehicle according to $$a_y = \omega \cdot v_{fz}$$

where $v_{fz}$ is the speed of the vehicle, and $\omega$ is the yaw velocity of the vehicle. Vehicular yaw velocity $\omega$ is calculated according to $$\omega = \frac{(v_{SR} - v_{SL})\frac{1}{R_A}}{1 + v_{fz}^2 \cdot F_{KORR}}$$

where $R_A$ is the tread width, and $F_{KORR}$ is a correction factor. Correction factor $F_{KORR}$ is an empirical value which, e.g. compensates for possible tire slip.

In the exemplary embodiment shown in FIG. 4, vehicular acceleration $a_{fz}$, speed $v_{RVL}$ of the left front wheel, speed $V_{RHL}$ of the left rear wheel, speed $v_{RVR}$ of the right front wheel, and speed $v_{RHR}$ of the right rear wheel are provided by an electronic stability program 13. Details of such an electronic stability program can be taken from the article "FDR—die Fahrdynamikregelung von Bosch" (ESP—the Electronic Stability Program of Bosch), by A. van Zanten, R. Erhardt, and G. Pfaff, ATZ Automobiltechnische Zeitschrift (Automobile Technology Magazine), 96 (1994) 11, pages 674 to 689.

List of Reference Numerals 1 step: read in the wheel speed
2 step: determine the deceleration of the wheel
3 decision block:

$$|a_R|>k|a_{fz}$$

4 step:
5 step: interpolation
6 step: read in the wheel speed
7 decision block
10 reference-speed calculator
11 reference-speed calculator
12 curve calculator
14 means for detecting a signal that indicates cornering of a vehicle
$a_{fz}$ deceleration of the vehicle
$a_R$ deceleration of a wheel
$a_y$ transverse acceleration of the vehicle
k weighting value
t time
v speed
$v_{fz}$ speed of the vehicle
$v_R$ (circumferential) speed of a wheel
$v_{RVL}$ (circumferential) speed of the left front wheel
$v_{RHL}$ (circumferential) speed of the left rear wheel
$v_{RVR}$ (circumferential) speed of the right front wheel
$v_{RHR}$ (circumferential) speed of the right rear wheel
$v_S$ reference speed
$v_{SL}$ reference speed on the left side of the vehicle
$v_{SR}$ reference speed on the right side of the vehicle
$v_{s,neu}$ the interpolated value of the reference speed
$v_{s,alt}$ the previous value of the reference speed
$v_{WL}$ true speed on the left side of the vehicle
$v_{WR}$ true speed on the right side of the vehicle
$R_A$ tread width of the vehicle
$F_{KORR}$ correction factor
α constant, which is advantageously the weighting value
Δt cycle time for the interpolation
ω yaw velocity of the vehicle

What is claimed is:

1. A method one of for detecting cornering of a vehicle and for ascertaining the transverse acceleration of the vehicle, characterized in that a signal indicating one of cornering of the vehicle, a measure of the curve radius, and the transverse acceleration of the vehicle is detected for at least each side of the vehicle, using a reference speed; a reference speed of a side of the vehicle being determined as a function of the deceleration of at least one wheel on this side of the vehicle.

2. The method as recited in claim 1, characterized in that the speed of the wheel is ascertained, and the deceleration of the wheel is determined by differentiating the speed of the wheel with respect to time.

3. The method as recited in claim 1, characterized in that the reference speed of the wheel is set equal to the speed of the wheel, when the deceleration of the wheel is less than or equal to the deceleration of the vehicle, after the vehicle deceleration has been increased by means of a weighting value.

4. The method as recited in claim 3, characterized in that the deceleration of the vehicle is multiplied by the weighting value.

5. The method as recited in claim 3, characterized in that the weighting value is formed as a function of the driving situation.

6. The method as recited in claim 3, characterized in that the weighting value assumes a value between 1.3 and 1.5 in response to sharp vehicle deceleration, and a value between 1.0 and 1.2 in response to low vehicle deceleration.

7. The method as recited in claim 1, characterized in that the reference speed of the wheel is interpolated, when the deceleration of the wheel is greater than the deceleration of the vehicle, after the vehicle deceleration has been increased by means of the weighting value.

8. The method as recited in claim 7, characterized in that the reference speed is interpolated according to $$v_{s,neu} = v_{s,alt} - \alpha a_{fz} \Delta t$$

where $v_{s,neu}$ is the interpolated value of the reference speed, $v_{s,alt}$ is the previous value of the reference speed, α is a constant, which is advantageously the weighting value, $a_{fz}$ is the deceleration of the vehicle, and Δt is the cycle time for the interpolation.

9. The method as recited in claim 7, characterized in that the reference speed of the wheel is set equal to the speed of the wheel, when the speed of the wheel is greater than or essentially equal to the wheel reference speed obtained by interpolation.

10. The method as recited in claim 1, characterized in that the speed of at least two vehicle wheels is ascertained, and the reference speed of each side of the vehicle is ascertained, the reference speed of a wheel being determined as a function of the deceleration of the fastest wheel on the side.

11. A device for one of detecting cornering of a vehicle and ascertaining the transverse acceleration of the vehicle, characterized in that the device has a curve calculator one of for detecting a signal indicating vehicle cornering, for ascertaining a measure of the curve radius, and for determining the transverse acceleration of the vehicle, as a function of a reference speed of at least each side of the vehicle; and in that the device has at least two reference-speed calculators for determining a reference speed of at least one side of the vehicle, as a function of the deceleration of at least one wheel on this side of the vehicle.

12. A method for detecting cornering of a vehicle, comprising the steps of:

detecting a signal indicating one of cornering of the vehicle, a measure of a curve radius and a transverse acceleration of the vehicle for at least each side of the vehicle using a reference speed; and determining the reference speed of each side of the vehicle as a function of a deceleration of at least one wheel on the side of the vehicle.

13. the method according to claim 12, further comprising the steps of:

ascertaining a speed of the wheel; and determining the deceleration of the wheel by differentiating the speed of the wheel with respect to time.

14. The method according to claim 12, further comprising the step of setting the reference speed of the wheel equal to a speed of the wheel when the deceleration of the wheel is less than or equal to a deceleration of the vehicle after the deceleration of the vehicle has been increased by a weighting value.

15. The method according to claim 14, wherein the deceleration of the vehicle is increased by multiplying the deceleration of the vehicle by the weighting value.

16. The method according to claim 14, further comprising the step of forming the weighting value as a function of a driving situation.

17. The method according to claim 14, wherein the weighting value is between 1.3 and 1.5 in response to a shaft vehicle deceleration and between 1.0 and 1.2 in response to a low vehicle deceleration.

18. The method according to claim 12, further comprising the step of interpolating the reference speed of the wheel when the deceleration of the wheel is greater than a deceleration of the vehicle after the deceleration of the vehicle is increased by a weighting value.

19. The method according to claim 18, wherein the reference speed is interpolated in the interpolating step according to:

$$v_{s,neu} = v_{s,alt} - \alpha a_{fz} \Delta t$$

wherein $v_{s,neu}$ represents the interpolated value of the reference speed;

$v_{s,alt}$ represents a previous value of the reference speed;

$\alpha$ represents a constant;

$a_{fz}$ represents the deceleration of the vehicle; and $\Delta t$ represents a cycle time for the interpolation.

20. The method according to claim 19, wherein the constant is the weighting value.

21. The method according to claim 18, further comprising the step of setting the reference speed of the wheel equal to a speed of the wheel when the speed of the wheel is greater than or equal to the wheel reference speed interpolated in the interpolating step.

22. The method according to claim 12, further comprising the step of ascertaining a speed of at least two vehicle wheels, the reference speed determining step including the substeps of ascertaining the reference speed of each side of the vehicle and determining the reference speed of a wheel as a function of the deceleration of a fastest wheel on the side of the vehicle.

23. A method for ascertaining a transverse acceleration of a vehicle, comprising the steps of:

detecting a signal indicating one of cornering of the vehicle, a measure of a curve radius and the transverse acceleration of the vehicle for at least each side of the vehicle using a reference speed; and determining the reference speed of each side of the vehicle as a function of a deceleration of at least one wheel on the side of the vehicle.

24. the method according to claim 23, further comprising the steps of:

ascertaining a speed of the wheel; and determining the deceleration of the wheel by differentiating the speed of the wheel with respect to time.

25. The method according to claim 23, further comprising the step of setting the reference speed of the wheel equal to a speed of the wheel when the deceleration of the wheel is less than or equal to a deceleration of the vehicle after the deceleration of the vehicle has been increased by a weighting value.

26. The method according to claim 25, wherein the deceleration of the vehicle is increased by multiplying the deceleration of the vehicle by the weighting value.

27. The method according to claim 25, further comprising the step of forming the weighting value as a function of a driving situation.

28. The method according to claim 25, wherein the weighting value is between 1.3 and 1.5 in response to a shaft vehicle deceleration and between 1.0 and 1.2 in response to a low vehicle deceleration.

29. The method according to claim 23, further comprising the step of interpolating the reference speed of the wheel when the deceleration of the wheel is greater than a deceleration of the vehicle after the deceleration of the vehicle is increased by a weighting value.

30. The method according to claim 29, wherein the reference speed is interpolated in the interpolating step according to:

$$v_{s,neu} = v_{s,alt} - \alpha a_{fz} \Delta t$$

wherein $v_{s,neu}$ represents the interpolated value of the reference speed;

$v_{s,alt}$ represents a previous value of the reference speed;

$\alpha$ represents a constant;

$a_{fz}$ represents the deceleration of the vehicle; and $\Delta t$ represents a cycle time for the interpolation.

31. The method according to claim 30, wherein the constant is the weighting value.

32. The method according to claim 29, further comprising the step of setting the reference speed of the wheel equal to a speed of the wheel when the speed of the wheel is greater than or equal to the wheel reference speed interpolated in the interpolating step.

33. The method according to claim 23, further comprising the step of ascertaining a speed of at least two vehicle wheels, the reference speed determining step including the substeps of ascertaining the reference speed of each side of the vehicle and determining the reference speed of a wheel as a function of the deceleration of a fastest wheel on the side of the vehicle.

34. A device configured to detect cornering of a vehicle, comprising:

a curve calculator configured to detect a signal indicative of one of vehicle cornering, a measure of a curve radius and a transverse acceleration of the vehicle as a function of a reference speed of at least each side of the vehicle; and at least two reference-speed calculators configured to determine the reference speed of at least one side of the vehicle as a function of a deceleration of at least one wheel on the side of the vehicle.

35. A device configured to ascertain a transverse acceleration of a vehicle, comprising:

a curve calculator configured to detect a signal indicative of one of vehicle cornering, a measure of a curve radius and the transverse acceleration of the vehicle as a function of a reference speed of at least each side of the vehicle; and at least two reference-speed calculators configured to determine the reference speed of at least one side of the vehicle as a function of a deceleration of at least one wheel on the side of the vehicle.

* * * * *